INVENTOR
WILLIAM W. HANSHEW

BY *Jerome P. Bloom*

ATTORNEY

INVENTOR
WILLIAM W. HANSHEW

BY Jerome P. Bloom

ATTORNEY

United States Patent Office 3,616,519
Patented Nov. 2, 1971

3,616,519
REEL FABRICATION
William W. Hanshew, Rte. 1, Brookville, Ohio 45309
Filed July 3, 1969, Ser. No. 838,965
Int. Cl. B23p *19/00, 23/04, 11/00*
U.S. Cl. 29—430
30 Claims

ABSTRACT OF THE DISCLOSURE

Continuous system and method for fabricating reels having circular end discs and a core section, comprising a mechanism for boring and drilling blanks, a printer, a saw mechanism for cutting circular discs from said blanks, an assembly station at which two end discs and a core are positioned in final assembly, a riveting mechanism for securing a disc to each end of each core, conveyor means preceding each of said bore and drill mechanism, printer, saw mechanism, assembly station and riveting mechanism, and actuating switches contacted by said blanks or discs in an automatic movement and positioning thereof to energize the respective mechanism, to hold the blanks or discs in predetermined position and to release the blanks or discs for movement to the next mechanism. The riveting mechanism inserts a blind rivet through aligned holes drilled in an assembled disc and core and on retraction flares the end of the rivet outwardly into clamping engagement to complete the fabrication cycle.

BACKGROUND OF THE INVENTION

(1) Field of the invention

This invention relates to apparatus and a method for continuous automatic fabrication of reels used for metallic wire and the like, from square wooden blanks which are cut into circular end discs and from plastic cylindrical cores. An end disc is assembled in the desired position at each end of a core and riveted thereto.

(2) The prior art

To the best of applicant's knowledge the prior art has not developed nor utilized an automatic integrated system for the fabrication of reels of the type described above. In the prior art method each operation on the wooden blanks is carried out independently, and the final assembly and riveting operations are carried out by operators of machines to which supplies of discs and cores are delivered periodically.

The prior art method of fabrication of reels is slow, laborious and relatively expensive, and it is thus apparent that there is a need for a system and method which will avoid these disadvantages.

SUMMARY OF THE INVENTION

The present invention provides apparatus and a method for the automatic, continuous production of reels which requires minimal operator attendance and which is rapid in operation, thereby reducing production costs substantially. Moreover, the apparatus of the invention is precise in operation, resulting in reels of better quality, with fewer defects, as compared to the prior art products. It features unique and improved riveting apparatus.

These and other advantages are accomplished by the features of construction, the parts and the combinations thereof, and the mode of operation as hereinafter described or illustrated in the attached drawings or their equivalents.

BRIEF DESCRIPTION OF THE DRAWINGS

Reference is made to the accompanying drawings wherein is shown a preferred embodiment of the invention.

DESCRIPTION OF THE PREFERRED EMBODIMENT

It is here noted that the accompanying drawings are both diagrammatic and schematic in character. Only so much detail is here disclosed as would enable one versed in the art to practice the present invention. Repetitive, obvious, and exhaustive detail has been avoided.

Figure 4:
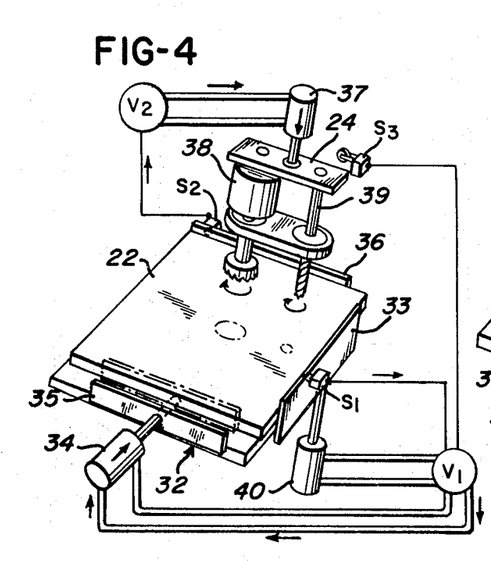
FIG. 4 is a perspective view of the bore and drill mechanism at the start of its operation.
Figure 5:
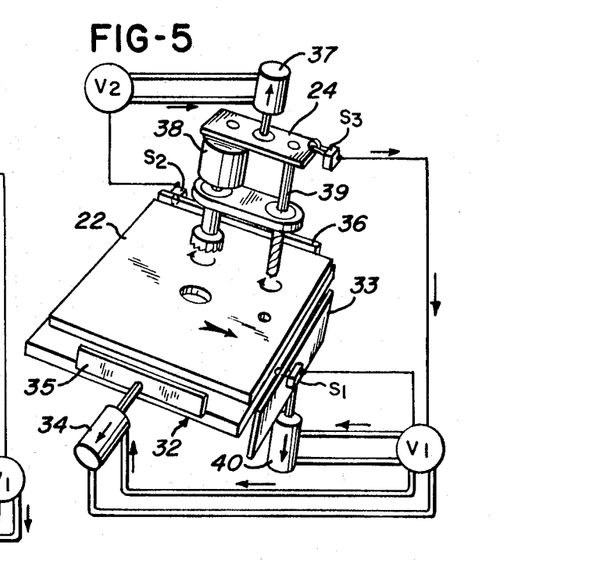
FIG. 5 is a perspective view of the bore and drill mechanism at the completion of its operation.

The invention system includes first a conventional belt conveyor section 20 which inclines upwardly to a bore and drill station. Positioned immediately over the upper run of the section 20, at its beginning, is a container 21. Stacked in the container 21 are rectangular plywood blanks 22. The bottom of the container is suitably slotted (not shown) to accommodate the movement through its lower portion of pick-up fingers 23. The latter are connected to and spaced longitudinally of the conveyor belt. They project sufficiently so that in the course of their movement they successively pick up the lowermost blank in container 21, eject the blank through a suitable container slot and they carry it forwardly on the conveyor belt to the bore and drill platform 32. Since the latter inclines downwardly from the end of section 20, the blank leaving the conveyor belt gets a gravity assist. As the blank drops into position on the platform, it engages a switch S–1 secured to the limiting alignment member 33 in its path. Noting FIGS. 3–5 of the drawings, Switch S–1 is connected to energize suitable valving control mechanism, here identified schematically as V–1, to direct fluid under pressure against a piston (not shown) contained in a cylinder 34 so as to have the projected rod thereof move a plate 35 to engage one side of the blank and clamp it to a stationary parallel abutment plate 36 on the platform 32. The clamping position of plate 35 is shown in broken lines in FIG. 4. Thus fixed and contained on three sides, the blank is established in a precise position for boring and drilling. As the blank is clamped laterally, it contacts a switch S-2 on the plate 36. This energizes a self cycling valving mechanism, here schematically identified as V-2, associated with a pneumatic cylinder 37 positioned above the platform. The latter has contained therein a piston the projected rod of which mounts a plate 24 at right angles thereto, to be disposed thereby above and parallel to the platform 32. Fixed in dependent relation to the plate 24 are an electrically energized center boring tool 38 and a radially offset drill 39. In the case illustrated, a conventional belt drive mechanism may be used to interconnect and provide a drive from the drive shaft of the boring tool 38 to the drill 39. This insures their simultaneous and conjoint operation under the control of a continuously operating motor. The latter is energized as long as the described system is in operation. Accordingly, as a consequence of the operation of the valve control mechanism V-2, the plate 24 is lowered to have the tool 38 cut a large circular opening in the center of the blank while the drill 39 cuts a smaller circular hole spaced radially outward therefrom and in the direction of the limiting plate 33. The controls for the cylinder 37 are conventionally arranged so that on completion of the boring and drilling operation fluid under pressure is directed to move the contained piston in a reverse direction to cause the plate 24 to lift from the platform together with the connected boring and drilling devices 38 and 39. In the course of its upward travel the plate 24 engages a switch S-3, shown in FIG. 5. This causes the valving mechanism V-1 and associated structure to channel fluid under pressure so there occurs simultaneously a retraction of the piston rod associated with the pneumatic cylinder 34 and a similar retraction of a piston rod projected from a similar cylinder 40 which connects to the limit plate 33. The latter rod lowers plate 33 from the path of the blank 22 and the former withdraws the plate 35 from its side clamping engagement with the blank. Due to the inclination of the platform 32, the blank 22 slides therefrom under the influence of its own weight to the adjacent lowered end of a second upwardly inclined conveyor section 41. As blank 22 leaves platform 32, switch S-3 is passed by plate 24 and valve V-1 cycles to direct fluid to raise plate 33 in the path of the next blank.

Figures 1, 2, 3, 6, 9, 10:
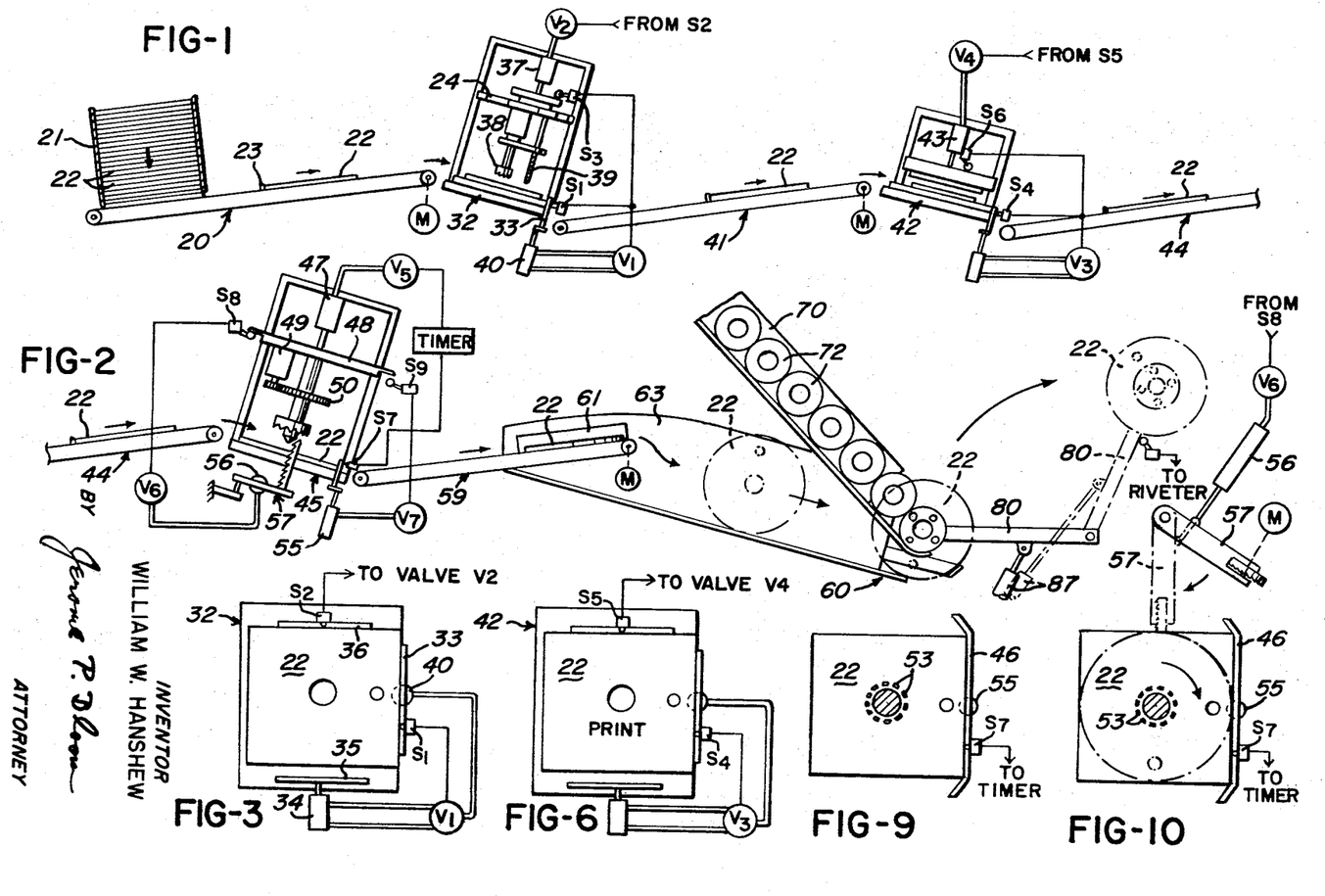
FIG. 1 is a diagrammatic representation of a bore and drill mechanism and printer and associated conveyor and actuating means according to the invention.
FIG. 2 is a diagrammatic representation of a saw mechanism and assembly station and associated conveyor and actuating means of the invention forming a continuation of the apparatus of FIG. 1.
FIG. 3 is a diagrammatic illustration of the actuating means of the bore and drill mechanism.
FIG. 6 is a diagrammatic illustration of the actuating means of the printer.
FIG. 9 is a diagrammatic illustration of the actuating means of the saw mechanism at the start of its operation.
FIG. 10 is a diagrammatic illustration of the actuating means of the saw mechanism at the completion of its operation.

The section 41 is constructed generally similar to the first conveyor section and includes spaced pick-up fingers which project therefrom to insure the forward and upward direction of the blanks 22 to a printing platform 42 which immediately follows. The platform 42 inclines downwardly from the end of the conveyor section 41 similar to platform 32 and the blank 22 is similarly dropped thereon and positioned under a printing device thereabove. Here a limiting plate at the lower end of the platform mounts a switch S-4 which when contacted by blank 22 energizes controls for a side clamping plate such as that previously described as 35 in reference to the boring and drilling platform. In this instance, noting FIG. 6, when here clamped against a stationary plate and fixed for printing, the blank hits the switch S-5 which energizes a valving control mechanism V-4 in connection with a pneumatic cylinder 43 to direct fluid under pressure to operate the piston therein to project its connected rod. The rod carries an interconnected printing mechanism to move it downwardly and suitably imprint the blank 22 therebelow. As in the case of the boring and drilling mechanism, when the printing is effected the rod of the cylinder 43 automatically lifts under the influence of the fluid control mechanism associated with its connected piston. As the printing mechanism moves upwardly to its retracted position, it engages a switch S-6 which in turn controls a valving mechanism V-3. The valving mechanism V-3 is caused to function so as to temporarily retract from the path of the printed blank 22 the limiting plate, which previously held it in position on the platform 42, together with the side clamping plate. The operation is as described and the structure related is as described with reference to the bore and drill platform 32.

As this occurs, the imprinted blank slides down off the printing platform, under the influence of its own weight, to drop on the lower end of a third conveyor belt section 44. The latter is inclined upwardly and of the same construction as the first two sections. Moreover, the printed blank is pushed similarly to and off the remote end of the belt and on to an immediately following downwardly inclined sawing platform 45.

Figure 7:
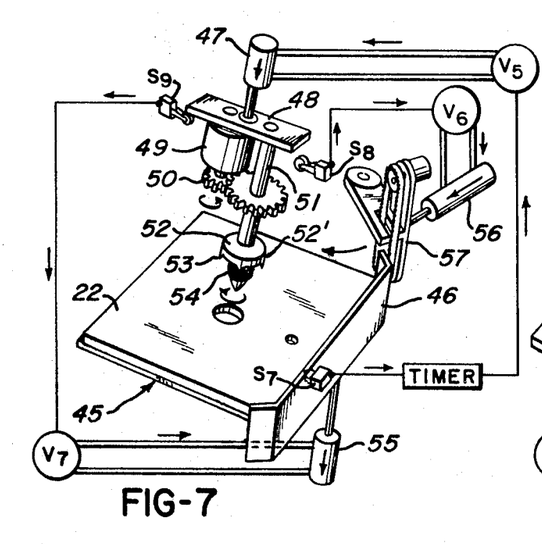
FIG. 7 is a perspective view of the saw mechanism at the start of its operation.

As the blank 22 moves on to the sawing platform 45 at this point, it abuts a cup-like retaining member or limiting plate 46 on which is mounted a switch S-7. The blank comes into engagement with the switch. This causes the energization of a timer which through suitable control means operates a valve control system, designated as V-5, connected with a pneumatic cylinder unit 47. Contained in the cylinder 47 is a piston having a projected rod the extremity of which mounts a plate 48 spaced above and parallel to the platform 45. Fixed to depend from the plate 48 is a motor 49 which is continuously driven during the operation of the system. The motor drive shaft is connected by suitable gearing 50 to continuously drive a shaft 51. The shaft 51 bears in and depends from the mounting plate 48 in a coaxial alignment with the centrally bored aperture in the blank 22 therebelow, which at this point is held in an appropriate position by the limiting plate 46. Fixed about the shaft 51 adjacent and spaced from its dependent extremity is an annular plate 52 having a peripheral skirt 52' which depends therefrom and includes projected teeth 53. The teeth 53 are arranged to depend perpendicular to the platform 45 and define a circle the diameter of which is greater than the central opening in the blank 22 therebelow.

As noted previously, as a blank 22 moves into position on the sawing platform, it engages a switch S-7 and through the timer operation there will be produced an activation of the valve control system V-5 to transmit pressure fluid to the cylinder 47 to cause, in an obvious manner, a lowering of the plate 48. It is noted at this point that there is positioned about the lower extremity of the shaft 51 a spring 54 contained between the annular plate 52 and a limiting device at the lower end of the shaft. As the plate 48 is lowered, it carries the motor 49 and shaft 51 therewith, the latter of which is continuously driven. As the lowermost extremity of shaft 51 enters the central opening in the blank 22, the spring 54 seats its lower end to the blank about its opening and is compressed to store energy as the teeth 53 approach and finally bite into the blank in a centered position.

In the course of this latter happening, the plate 48 operates switch units S-8 and S-9. Switch S-9 functions through the medium of a valving control system V-7 to displace the retaining or limiting plate 46 through the medium of a pnuematic control unit 55 such as those previously described, while the switch S-8 functions through the medium of a valving control mechanism V-6 to operate through a pneumatic control unit 56 a band saw assembly 57. The assembly 57 is mounted so that as the control rod projects from the pneumatic cylinder 56 it will swing the teeth of the cutting blade into a position at the edge of the platform 45 and at a radial distance from the center of the blank which is the minimal distance permitted by the size of the blank. It is noted that when positioned on the sawing platform the blank 22 projects peripherally thereof to a minor degree. This being the case, as the teeth 53 bite into the blank 22, concentric to its center, the blank 22 will be rotated thereby, on the platform, the retaining or limiting plate 46 having been cleared. Since the band saw is continuously driven, as the blank is rotated it will trim the blank to form a substantially perfect circle on its periphery.

Under the influence of the timing mechanism, which is of a conventional nature, when the operation of the band saw is completed, fluid will be directed in the cylinder 47 to raise the plate 48 and the connected structure. As the pressure is relieved on the teeth 53, they will tend to free themselves from the blank 22, whereupon the spring 54 will accomplish a positive release of the blank through the medium of the previously stored energy. The shape of the disc at this point is evidenced in FIG. 8 of the drawings.

Figure 8:
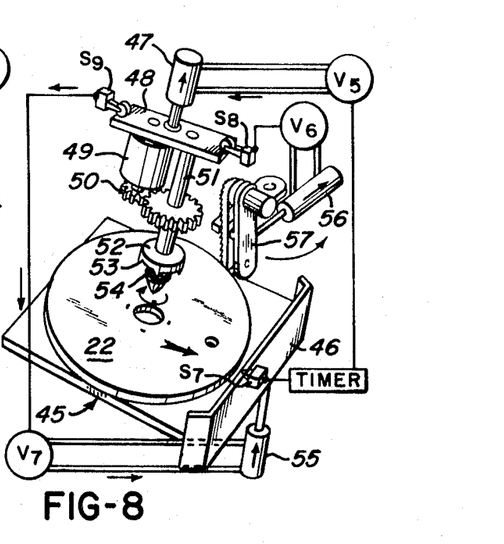
FIG. 8 is a perspective view of the saw mechanism at the completion of its operation.

As the plate 48 moves upwardly, it will re-engage the switch S-8 and S-9, switch S-8 first causing the band saw to be swung away from the platform 45. The function of the switch S-9 is, at this point, to move plate 46 to its limiting position at the trailing edge of the sawing platform 45. However, prior to the plate 46 returning to this position, the blank 22 which now has a disc form will drop off the sawing platform 45, under the influence of gravity, to the relatively lowered end of a following upwardly inclined conveyor section 59. The conveyor section 59 is generally of the nature of those conveyor sections previously described. Here however, the surface of the belt portion does not require fingers. It is per se so textured to frictionally adhere to and carry forward each disc 22 which drops thereon under the influence of gravity and move it upwardly towards an assembly station 60.

Figure 12:
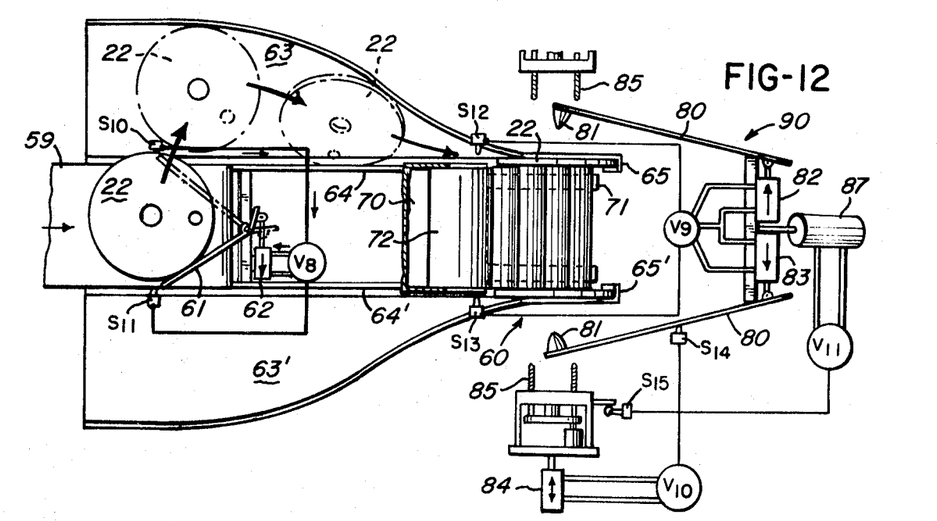
FIG. 12 is a top plan view of the assembly station of FIG. 11.

Adjacent and over the uppermost end of the upper run of the conveyor belt of the section 59 is a pivotally mounted control arm 61. The pivot of arm 61 is transversely centered. As shown in FIG. 12 of the drawings, the arm as there disposed inclines laterally and projects in an angular relation to one side of the conveyor belt. So disposed the arm 61 lies in the path of the disc 22 carried upwardly of the conveyor section 59. At a portion thereof which projects therefrom adjacent its pivot the arm 61 is connected to and under the control of the operating rod of a piston contained in a pneumatic cylinder 62. The piston in the latter is appropriately actuated by fluid such as air under pressure which is directed thereto by way of a valving mechanism V-8.

Figure 11:
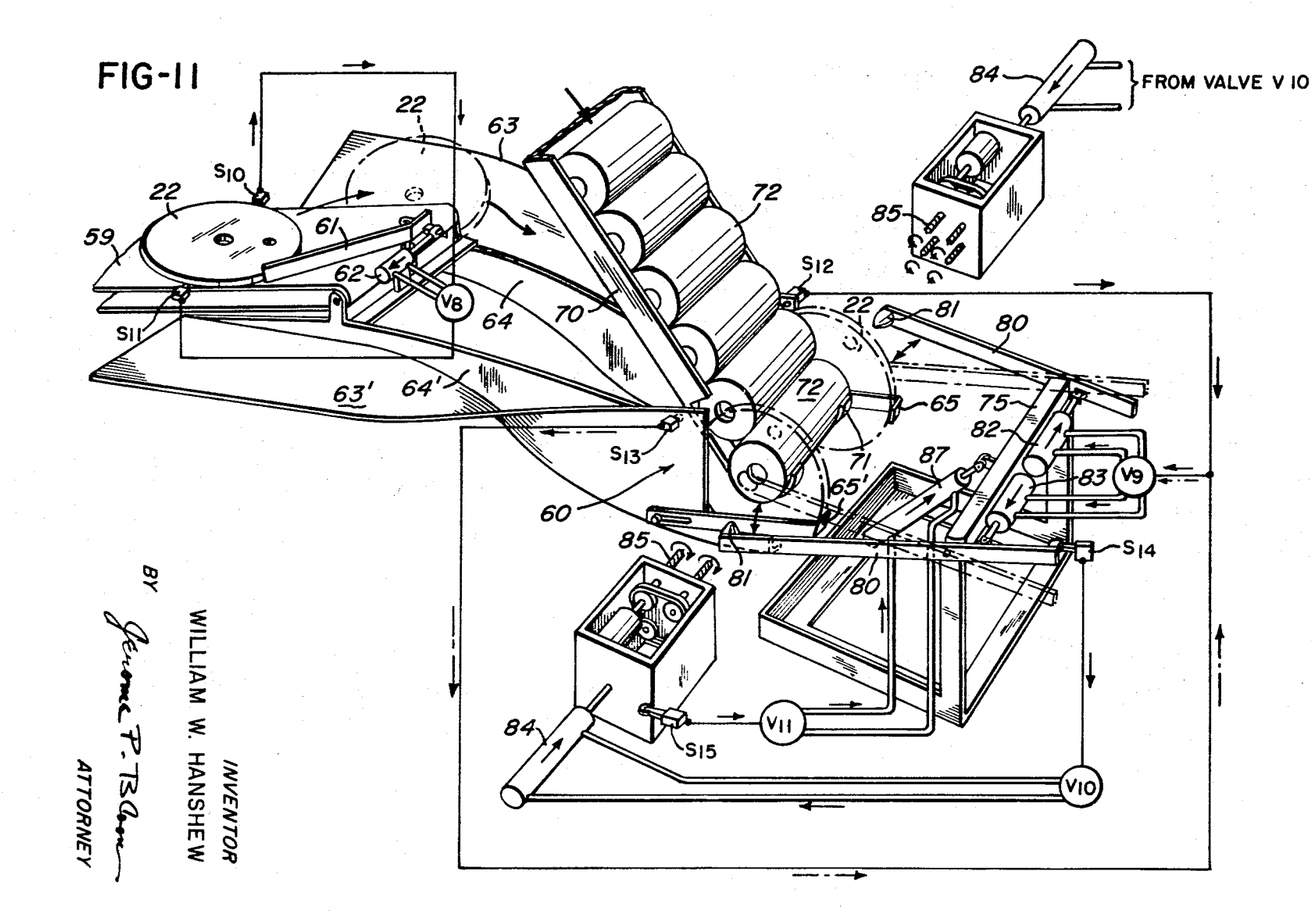
FIG. 11 is a perspective view of the assembly station.

Noting FIGS. 11 and 12, as a disc 22 engages the arm 61, angularly disposed as there shown, the disc is cammed laterally over a switch S-10 at the side of the belt opposite that to which the arm is angularly directed. Switch S-10 energizes the valving mechanism related to the piston in cylinder 62 to cause the arm 61 to be swung about its pivot until it inclines angularly to the opposite side of the conveyor belt. In the process, the engaged disc 22 is pushed laterally from the belt and into a chute 63. The form and configuration of the latter is such to control the disc 22 to induce it to move forwardly from the conveyor section 59 and to assume a vertical position with its peripheral edge entering and riding in a channel shaped guide member 64. The latter is longitudinally directed substantially in line with the adjacent edge of the conveyor section 59 and is downwardly inclined. The disc 22 finally comes to rest against a stop 65 at the end of the guide 64 and it is positioned thereby at an assembly station 60.

As the following disc 22 on the conveyor belt of section 59 comes in contact with the arm 61 in its new position, this disc is cammed oppositely across the conveyor belt and over a switch S-11. The switch S-11 is in connection with the control mechanism V-8 which directs air to reverse the operation of the piston in the cylinder 62 in a conventional manner. This results in the arm 61 swinging back to its full line position of FIG. 12 to carry this second disc into a chute section 63' at the opposite side of the conveyor. This latter chute section 63' functions as the section 63 to guide the disc 22 into an upright position and into a channel formed guide member 64' spaced transversely from and arranged parallel to the guide 64. The edge of the second disc 62 enters the guide 64' and rolls the length thereof to its extremity where it abuts a stop 65' which is laterally aligned with the stop 65.

Figure 14:
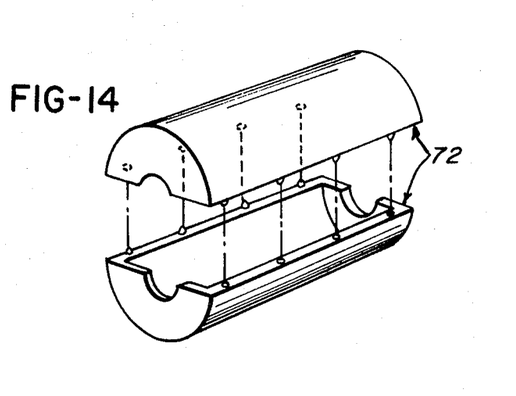
FIG. 14 is an exploded view of the core of a reel.

Positioned above and between the respective side chute sections 63 and 63', inclined thereto and in line with and following the conveyor section 59, is a vertically inclined feed chute 70. The open lower end of the chute 70 includes a pair of transversely spaced axially projected fingers 71 the extremities of which have a smoothly arcuate hook-like form. Supported on and by the fingers 71 is a series of cylindrical core elements 72 which stack vertically thereabove and upwardly of the chute 70. The lowermost core element 72 is held by the fingers 71 in a position centered between and coaxial with the discs 22 at the assembly station 60. In this manner the respective elements of the reel to be fabricated are placed in the precise position in which they are required to be assembled. It is noted that each core element 72 is a hollow cylindrically formed unit the end walls of which have central apertures which mate in coaxial alignment with the central apertures bored in the discs 22. The core elements are diametrically split the length thereof and the split portions are interconnected by pin and socket devices which are conventionally provided at their mating edges.

As shown schematically in FIGS. 2, 11, 12 and 16, positioned outwardly of, adjacent, and to either side of the assembly station is a pivotally mounted arm 80. At their projected extremities most adjacent the station 60, the arms 80 each have formed thereon, at their most adjacent surfaces, a conical projection 81. The projections 81 are adapted to enter the central apertures in the adjacent discs 22 and, correspondingly, the central apertures in the ends of the abutted core 72.

As diagrammatically illustrated in the drawings, the arms 80 are swingingly mounted for pivotal movement in a relatively horizontal plane on an interconnecting bar support element 75. The latter is suitably supported by a frame to pivot about its longitudinal axis.

Thus there are conventional means providing for both a horizontal and a vertical pivot of the arms 80 and their conjoint operation.

As the discs 22 move into the assembly station they hit and operate switches S-12 and S-13 to direct fluid under pressure through valve V-9 to pneumatic control units 82 and 83. This swings arms 80 to cause their conical projections to engage in the respective ends of the core 72 as they project through the respectively adjacent discs 22. This produces a temporary assembled relation of the relatively free discs 22 and the intermediately positioned core. As this occurs, one of the arms 80 energizes through switch S-14 a conventional self-cycling valve mechanism V-10 to direct fluid under pressure to operate a pair of coaxially arranged pneumatic units 84 positioned to either side of the assembly station. The units 84 have contained therein pistons the projected rods 85 of which mount drill cages each including four rectangularly positioned projected drill rods 85 and containing a powered drive mechanism for the drill rods. The rods 85 to either side of the assembly station position about and concentric to the central opening in the adjacent disc 22.

Figure 13:
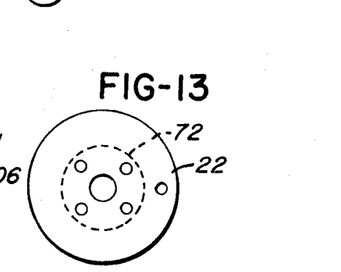
FIG. 13 is an end view of the reel elements after drilling at the assembly station.

When switch S-14 is energized the units 84 move to simultaneously bring the drill rods 85 into the discs 22 and the backing abutted end walls of the core 72 to drill four holes about their central apertures. The cycling of valve mechanism V-10 causes a retracting of the drill rods 85 and their cage units 84. In the course of retraction one drill cage engages a switch S-15 to operate a valve mechanism V-11 to direct air under pressure to the pneumatically operated piston in a cylinder 87, the piston rod of which projects and connects through suitable linkage to pivot about its axis the bar 75 connecting the arms 80. Since the arms 80 still position to clamp discs 22 to the core 72, as the arms are pivoted they carry the so assembled elements of a reel therewith to swing them upwardly to a riveting station 90.

It must be kept in mind that the control switches and components of the pneumatic system for control which is here described are illustrated in the drawings in purely schematic form. The structural nature thereof and their relative positions are not specifically illustrated since they are well within the knowledge of one versed in the same, once the functional description of the present disclosure is available.

Figure 19:
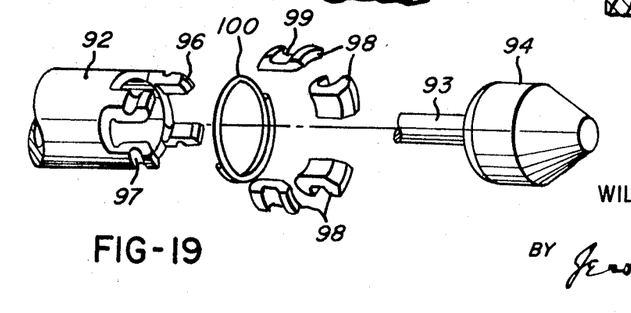
FIG. 19 is an exploded perspective view of the riveter.

Positioned to either side of the riveting station 90 is a riveting cage unit 91. Each unit 91 has four projected tubes 92 in line with and spaced from the four apertures in the respective ends of the reel assembly at the riveting station. As schematically illustrated, reciprocably mounted in and projected from within the rivet cages, through and outwardly of the tubes, in each instance, is a riveting control rod 93. The outermost projected end of each rod 93 has an expanded head portion 94. The latter is normally spaced beyond the projected end of the related tube 92. As seen from the drawings, the projected extremity of each tube 92 is reduced as to its external diameter to form thereon an outwardly facing shoulder 95. The head 94 of each rod 93 is composed of a central cylindrical portion of a diameter approximately equal to and not greater than the reduced end portion of the adjacent tube, while the respective ends of the head are gradually reduced to a generally frusto-conical shape.

The projected end of the tube 92 adjacent and spaced from the head 94 is formed to provide thereon four circularly and equidistantly spaced axially projected fingers 96. A circumferential groove 97 is defined intermediate the ends of each finger 96, the grooves in the respective fingers forming part of what would be a circumferential recess in the tube extremity if the same was not circularly interrupted. The respectively adjacent fingers define therebetween a generally rectangular space which is filled by a freely inserted expansion member 98 which axially projects beyond the fingers. As positioned within the spaces between the fingers 96, the expansion members 98 complete the circumferential extent of the projected extremity of the tube 92. Moreover, the expansion members 98 include in their exterior surfaces recesses 99 which mate with and form extensions of the recesses 97 in the fingers 96. The innermost surfaces of the expansion members 98 have complementary arcuate curves at their respective ends. Each end portion of the tube 92 to which an expansion member 98 seats between the fingers has a complementary curve, to permit a bearing rotation thereon of the inner end of an expansion member 98 as such members move to and from a position defining a completion of the cylindrical form of the end of the tube 92. The expansion members 98 are circumferentially contained and confined in a normally retracted position by a coil spring 100. The latter seats thereabout and in the mating recesses 97 and 99 of the fingers 96 and the expansion members 98. As will be seen with reference to FIGS. 17 and 18 of the drawings, on pulling a rod 93 inwardly of a tube 92, the innermost conically reduced surface portion of its head 94 will bear against the adjacent relatively arcuately formed inner surfaces of the projected portions of expansion members 98 to pivot them outwardly of the limits of the tube 92. The spring 100 serves to retain the expansion members in the course of their pivoting action. This will be further described with reference to the action of riveting the portions of the subject reel at the riveting station.

Figure 17:
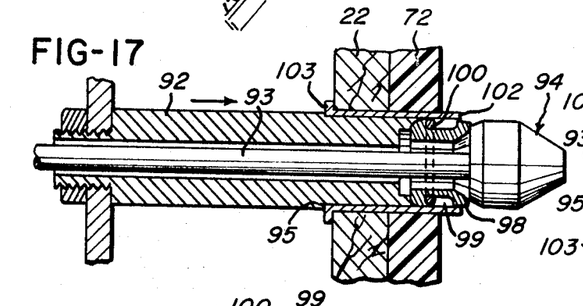
FIG. 17 is a sectional view showing the start of the riveting operation.

Positioned between each tube 92 and the aligned apertures in the adjacent end of the reel assembly at the riveting station is the lower end of a relatively vertical rivet feed chute 101. Rivets 102 are horizontally positioned within the chute and gravity fed, the lowermost end of the chute 101 having a through passage wherein a rivet is suspended in a positive axially aligned relation to the related rivet feed tube 92. The rivets are uniformly tubular in this instance but to the end thereof most adjacent the tube 92, they have an external flange 103.

Returning to the action of the invention system, as the reel assembly is swung into position at the riveting station through the medium of the arms 80, one of the latter engages a switch S–16. The switch S–16 functions to direct, through a timer, the operation of a valving unit V–12. The latter directs fluid under pressure to act simultaneously on aligned pistons of main pneumatic cylinder units 104 positioning to either side of the riveting station to have the connected rods thereof which mount the rivet cages 91 project and move the cages into the respective ends of the reel assembly at the riveting station. As this occurs, each tube 92 and the forwardly projected head 94 of the contained rod 93 passes through an aligned tubular rivet 102 in its path until the external flange 103 thereof abuts the shoulder 95 on the tube 92. In this manner the rivet is picked up to mount closely about the leading end of its controlling tube 92. So positioned, the rivet is carried inwardly of the aligned apertures in the adjacent disc 22 and abutted end wall portion of the core 72. In completing this process, the flange 103 is caused to seat to the disc 22. At this point, the rivet cages respectively engage a switch S–17 or S–18, as the case may be, which acts in one instance through a self-cycling valve V–13 and in the other through valve V–14 to activate a pneumatic control unit 105 of the type previously described. This results in the conjoint movnig of the rods 93 in each rivet cage inwardly of the related tubes 92. This is enabled by means of a linkage 106 within the rivet cage and connected to the rods and the function is under the control of the pneumatically actuated means 105 to the piston of which air is directed under pressure by the self-cyling valve unit. As the rods 93 related to the tubes in each rivet cage are drawn inwardly of the tubes, this causes each of the heads 94 to move inwardly, as previously described, of the rivet which mounts on and projects from the adjacent extremity of the related tube 92. Since the projected end of the rivet is within the core 72 at this point, the frusto-conical inner end of the related head 94 functions to act on the relatively projected extremities of the adjacent expansion members 98 to cause the projected end of the rivet within the reel to be flared backwardly in four parts and clamp against the inner periphery of the core end wall. The net result is a very simple and effective blind riveting operation, by means of which the discs 22 are fixedly clamped to the respective ends of the core 72 in an obvious manner.

Figure 18:
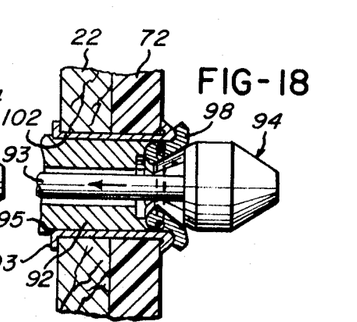
FIG. 18 is a fragmentary sectional view showing the completion of the riveting operation.

The self-cycling valve then produces a projection of the rods 93 by causing a reverse operation of the linkage 106. In the process of this occurring, the expansion members 98 are influenced by the spring 100 to return to a relatively nested relation within and axially projected relation to the fingers 96 on the tube 92.

Figure 15:
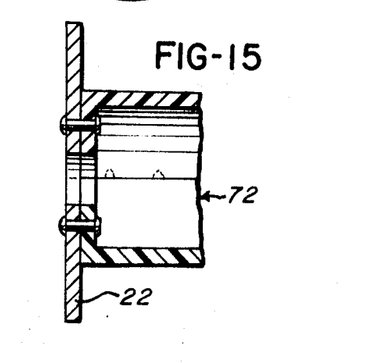
FIG. 15 is a fragmentary view, partly in section, of an assembled and riveted reel.
Figure 15A:
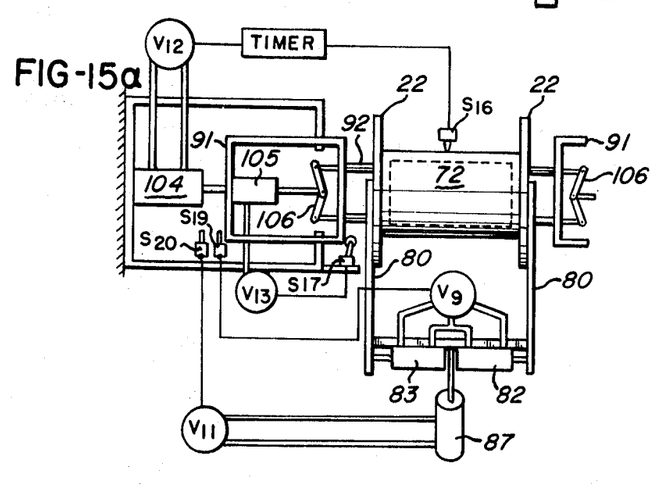
FIG. 15a is a diagrammatic illustration of the controls at the riveting station.
Figure 16:
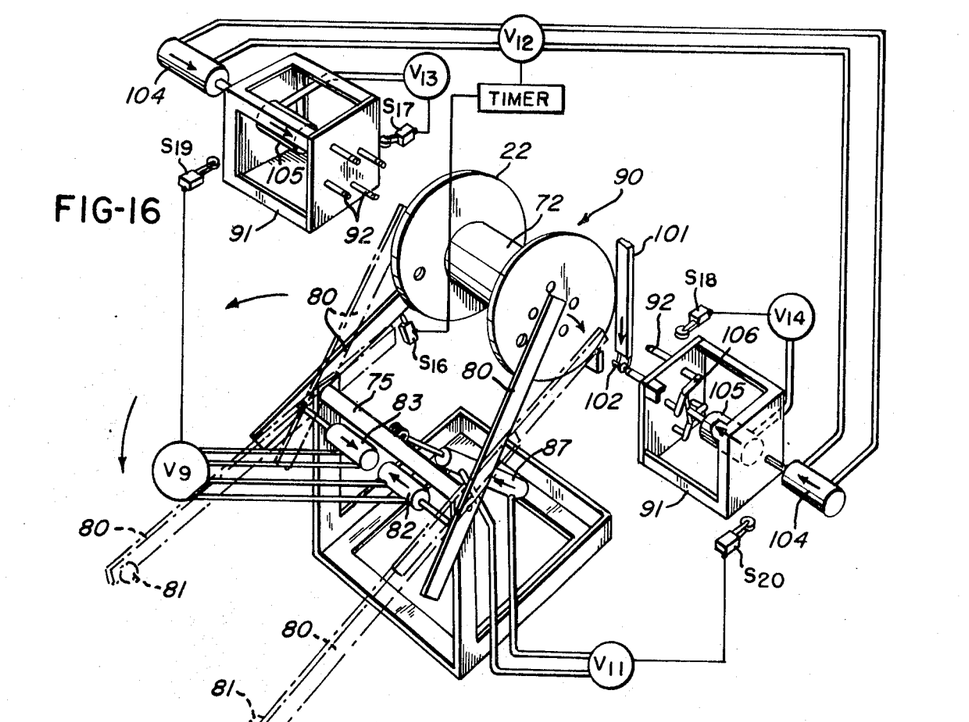
FIG. 16 is a perspective view of the conveyor and actuating means of the riveting mechanism.

In timed relation to the projection of the rods 93, the rivets cages 91 are withdrawn from the finished reel assembly, one abutting switch S–19 to operate the valve V–9 whereupon the cylinders 82 and 83 are actuated to influence a retraction of the arms 80 from the finished reel unit.

So released the finished reel drops to a suitable chute means (not shown) for gravity discharge from the riveting station. Shortly after the operation of switch S–19, the other cage 91 operates the switch S–20 which energizes the valve V–11. This time the valve V–11 directs fluid to make cylinder 87 pivot the bar 75 about its transversely extending longitudinal axis to swing the arms 80 back to the assembly station, ready to clamp together the arriving parts of the next reel unit.

It will be obvious from the foregoing that the invention provides for a high efficiency system and method for fabricating reels and like assembled articles not heretofore practiced. Substantial economies and significant advantages obtain therefrom. Once the system is installed all one needs be available is an observer for such maintenance as may prove advisable and material handling personnel for loading and warehousing.

Particular attention is directed to the automatic movement of and operation on the reel components as here contemplated together with the advantageous character of the blind riveting apparatus as here proposed. Not only are there substantial savings in man hours and expense but the resultant products will be of uniform high quality.

As noted, the invention envisions various forms of embodiments and application, only the preferred being illustrated by way of example.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. Apparatus for fabricating reels and like assemblies of plural parts comprising means defining working stations including forming and assembly and fixing stations, means for producing a continuing movement of parts of said apparatus to and from said assembly station, means for selectively and temporarily interrupting said parts at said stations, means rendered operative during at least a portion of said interruptions and in selective response thereto to automatically perform forming operations on said parts as required, means automatically responding to arrival of related parts at said assembly station to contain the same together in a required assembled form, and means rendered operative in an automatic response to the containing together of said related parts to fix said parts in their so assembled form.

2. Apparatus as in claim 1 characterized by means for storing said parts and for automatically feeding the same for delivery to said assembly station.

3. Apparatus as in claim 1 characterized by conveyor means for producing the continuing movement of parts to said assembly station, and there being at least one forming station including a platform inserted intermediately of spaced sections of said conveyor means to form a continuation thereof, interrupter means being associated with said platform and having in connection therewith cycling means for movement thereof to and from the path of parts moving to and from said platform in passing from one to another of said conveyor sections.

4. Apparatus as in claim 3 characterized by means associated with said interrupter means for effecting piercing and cutting operations on the parts moved onto said platform, in automatic response thereto, and said piercing and cutting means having controls for cycling thereof to and from the parts for the period the same are held from movement from said platform by said interrupter means.

5. Apparatus as in claim 3 characterized by said platform and conveyor sections being so oriented that said platform provides a base for gravity feed of parts therefrom to the following conveyor section as said interrupter means is moved from their path.

6. Apparatus as set forth in claim 3 characterized by a pair of said platforms interposed to define spaced forming stations intermediately of said conveyor means, each platform having in association therewith interrupter means for temporarily holding the parts which move thereon, there being in associated relation with one platform means for piercing and cutting openings in the parts which move thereon, and means associated with the other platform for forming the required peripheral outline of parts which move thereon.

7. Apparatus as set forth in claim 6 characterized by the parts moved by said conveyor means to and from said platforms being blanks for fabricating end plates or end panels of a reel or like product, the said one platform having in association therewith overlying means operative on movement of a blank thereunder to descend and bore therein a central opening and said other platform means having in association therewith saw means and means for producing a relative movement of the blank thereon and the saw to cut the periphery of said blank to a required outline prior to release thereof for movement to and by a following conveyor section.

8. Apparatus as and for the applications described in claim 7 characterized by channelling means in associated connection with a following conveyor section, to either side thereof, said channeling means extending to either side of said assembly station, and means operating in connection with said last mentioned following conveyor section lying in the path of formed blanks moved thereby to alternately cam said blanks first to the channelling means to the one side and then to the opposite side of said following conveyor means, said channelling means being formed to direct successive formed blanks to opposite sides of said assembly station and in the process to assume an upright parallel relation and means for feeding a core element to position between the blanks at said assembly station, and said containing means being rendered operative to clamp said blanks and the core therebetween by means actuated by said blanks in their arrival at said assembly station.

9. Apparatus as in claim 8 wherein said containing means are opposed members which move inwardly of said assembly station and there are means at said assembly station responsive to the containing means moving to clamp together the core and the formed blanks to drill through said blanks and core aligned apertures to receive fixing elements.

10. Apparatus as in claim 9 characterized by said containing means being a pair of pivoted arms and there being means for conjointly moving said arms to dispose the parts as assembled and clamped therebetween in said fixing station and there being means to either side of said fixing station for applying rivets in said aligned apertures and blind riveting the core to said end abutted formed blanks in an automatic response to arrival thereof in said fixing station.

11. Apparatus as in claim 10 wherein said rivet applying means include rivet mounting tubes containing a reciprocable rod which projects therethrough and has an expanded head on its projected extremity and means mounted to said tubes adjacent said head for operation by said head for blind riveting purposes.

12. Apparatus as in claim 1 characterized by said parts which are continuously moved being blanks for end plates or panels of a reel assembly or like product, there being means at said stations for centrally boring and peripherally modifying said blanks on arrival and means for separately directing the blanks of a successive pair, after forming thereof, to cause them to assume a generally parallel spaced relation in said assembly station, and means included to provide an automatic positioning of a core between said spaced parallel blanks, in position for fixing the respective parts together.

13. Apparatus as in claim 12 where there are two spaced forming stations with automatically operating boring means at one and a cutting tool and means for automatically operating to produce a relative rotation of a blank and said tool at the other to form the peripheral configuration required for the blank prior to movement thereof from said other forming station.

14. Riveting apparatus comprising tube means, rod-like means reciprocable within and projectable beyond one end of said tube means, and cooperating means on said one end of said tube means and an adjacent portion of said rod means, one of said cooperating means being displaceable by the other upon a predetermined reciprocation of said rod-like means for effecting a blind riveting operation.

15. Riveting apparatus as in claim 14 characterized by said displaceable means forming a part of said tube means and the other of said cooperating means forming an enlarged portion of said rod-like means.

16. Riveting appratus as in claim 15 wherein said one end of said tube means includes axially projected relatively rigid fingers and there being projectable elements between said fingers which are operated on by said enlarged portion of said rod-like means for effecting the blind riveting operation.

17. Apparatus as in claim 16 characterized by said enlarged portion of said rod-like means providing thereon a camming surface and said projectionable means having the form of axially projected fingers pivoted between said relatively rigid fingers.

18. Riveting apparatus as in claim 17 characterized by spring means engaging said axially projected fingers to said tube means during their pivoting action.

19. Riveting apparatus as in claim 18 characterized by said spring means being disposed circumferentially of said tube means and said axially projected fingers to control the position of said axially projected fingers.

20. A method of fabricating reels and like assemblies comprising the steps of feeding blanks for the ends or sides thereof in a continuing movement through plural working stations and, in transit, temporarily interrupting said blanks at said working stations, in said working stations producing reference means in said blanks and forming said blanks to a desired end configuration in an automatic response to the arrival of said blanks at said stations, and following the forming of said blanks continuing the movement thereof and delivering each successive pair of said blanks to a further working station constituting an assembly station, directing one of each said pair to opposite sides of said assembly station, disposing a reel core intermediate each successive pair of said formed blanks at said assembly station, and utilizing said reference means to fix said blanks in a contained relation to said core, in an automatic response to each said formed pair of blanks arriving at a position in said assembly station with a core therebetween.

21. A method of fabricating reels or like objects as in claim 20 wherein said reference means is produced by cutting each blank to produce therein at least one central aperture and at said assembly station containing each said pair of blanks in end abutting relation to said core through the medium of means inserted through the central apertures of said blanks, as they arrive at said assembly station.

22. A method of fabricating reels or like objects as in claim 21 characterized by the further step of drilling aligned apertures in said blanks and adjacent surfaces of the core as they temporarily dispose in said assembly station, in an automatic response to the blanks achieving an end aligned relation to said core, and, thereafter, inducing an automatic insertion of fixing elements in said aligned apertures.

23. A method of fabricating reels or like objects as in claim 22 characterized by the step of inducing a movement of the pair of formed blanks and the core therebetween from said assembly station to a riveting station in an automatic response to a completion of said drilling and, in an automatic response to arrival thereof at said riveting station, introducing fixing elements in the form of rivets in said aligned apertures and fastening them to fix together said formed blanks and said core.

24. A method of fabricating reels or like objects as in claim 20 wherein said reference means and said forming is achieved by the steps of boring a central hole in and contouring the periphery of said blanks in working stations prior to their arrival at said assembly station.

25. A method of fabricating reels or like objects as in claim 20 characterized by producing in a forming station a rotative movement between the blanks and cutting means whereby to contour the periphery of said blanks during the temporary interruption of their continuing movement to said assembly station.

26. A method of fabricating a reel assembly comprised of end discs in mutually supporting relation to opposite ends of an intermediately disposing core, including the steps of delivering a pair of said discs to an assembly station, at said assembly station inducing an orientation of said discs so that they dispose in a spaced apart parallel relation, directing a core between said discs and, in conjunction with the directing of said core between the discs, inducing a gripping of the assembly so defined to hold the parts frictionally in contact, with said discs abutting opposite ends of said core, and, while the assembly is so gripped, installing fasteners fixing said discs to respective ends of the core.

27. A method according to claim 26, in which the said assembly is gripped in one working station and, upon being gripped, is automatically moved to another working station, and said fasteners are installed on arrival of said assembly at said other working station.

28. A method according to claim 26, wherein the step of installing said fasteners includes the pushing of said fasteners through preformed holes in parts of the assembly in a sense inwardly of the maximum dimension of the core.

29. A method according to claim 26 wherein said parts are gripped in an automatic response to a predetermined positioning thereof and so gripped said assembly will move, in automatic response thereto, to a fastening station wherein fasteners are inserted simultaneously from opposite ends of the assembly through a respective disc and the core wall and secured in an automatic response to arrival of said assembly at said fastening station.

30. A method according to claim 26, wherein arrival of parts of the reel assembly at said assembly station initiates automatically a gripping of the reel parts and delivery thereof to a subsequent working station for installation of said fasteners.

References Cited

UNITED STATES PATENTS

| | | | |
|---|---|---|---|
| 2,753,622 | 7/1956 | Bieber et al. | 29—159 |
| 3,507,025 | 4/1970 | Ankeney | 29—155 |

THOMAS H. EAGER, Primary Examiner

U.S. Cl. X.R.

29—33 K, 33 P, 159, 200 B, 208 D, 243.53